July 18, 1967  W. F. JACOBY  3,331,617
HANDLE BAR CONSTRUCTION

Filed April 1, 1965  3 Sheets-Sheet 1

INVENTOR
WILLIAM FRED JACOBY
BY
*James L. Gudersen*
ATTORNEY

July 18, 1967  W. F. JACOBY  3,331,617
HANDLE BAR CONSTRUCTION
Filed April 1, 1965  3 Sheets-Sheet 2
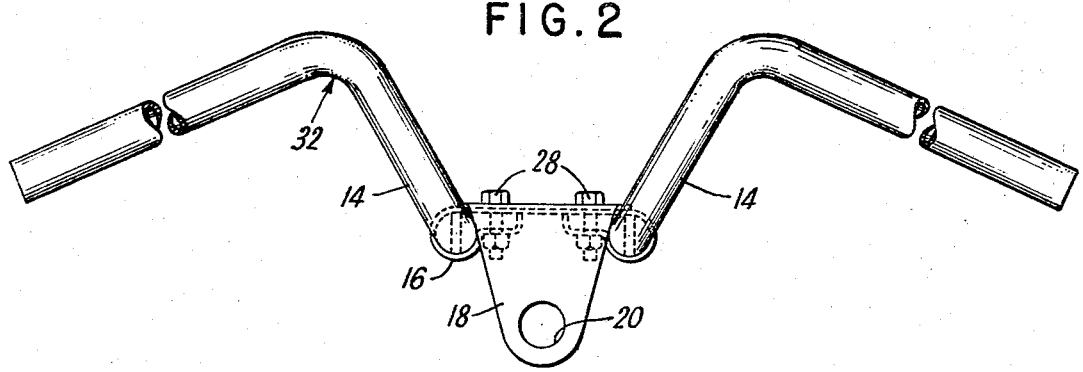
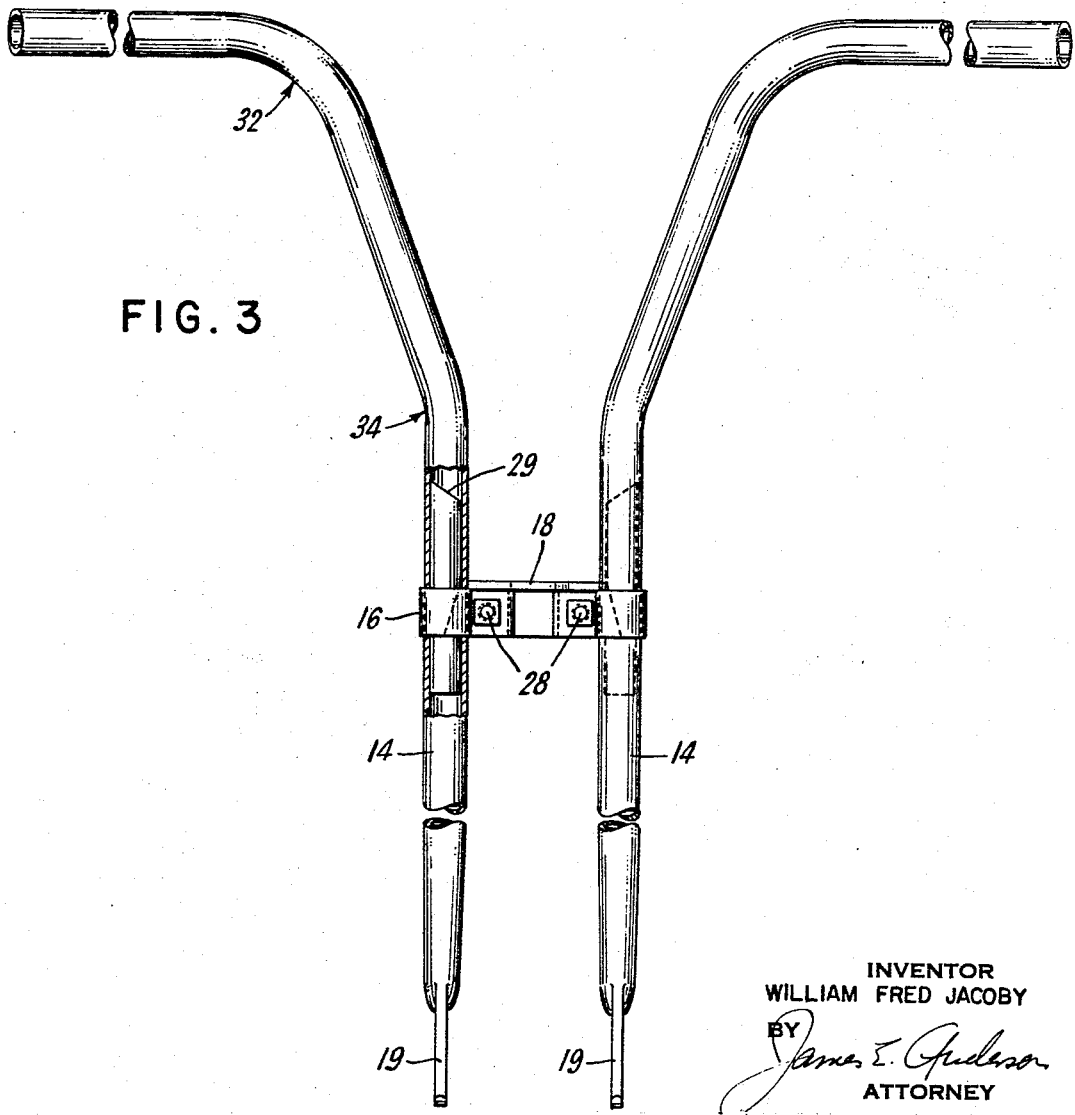
INVENTOR
WILLIAM FRED JACOBY
BY
ATTORNEY July 18, 1967 W. F. JACOBY 3,331,617
HANDLE BAR CONSTRUCTION
Filed April 1, 1965 3 Sheets-Sheet 3

INVENTOR
WILLIAM FRED JACOBY
ATTORNEY

3,331,617
HANDLE BAR CONSTRUCTION
William Fred Jacoby, Olney, Ill., assignor to American Machine & Foundry Company, a corporation of New Jersey
Filed Apr. 1, 1965, Ser. No. 444,735
3 Claims. (Cl. 280—279)

This invention resides in an improved handle bar and fork construction for a bicycle.

A handle bar design which recently has gained popularity is the so-called "high rise" type which is characterized by the bars being longer and sweeping upwardly to a considerably greater extent than in the ordinary type. The right and left handle bar portions of this type typically are integrally joined with a vertical portion at a central T which is connected to the stem of the front steering fork. Because of the longer length of the bars, measured from this T juncture, the leverage which can be exerted is appreciably increased, which has caused a greater incidence of structural failure in these parts.

It is the principal object of this invention to provide a handle bar construction having the same general aesthetic appearance as the unitary T type of high rise handle bar, but which is stronger. A further object is to provide such a handle bar construction which, in addition to being stronger in itself, lends reinforcement to the over-all front fork unit.

Further objects, advantages and details of this invention will become apparent upon reading of the following descrpition taken in conjunction with the accompanying drawings in which:

FIGURE 2 is a plan view of the two handle bars and the connecting bracket structure;

FIGURE 3 is a front view of the handle bars and bracket structure, partially broken away to reveal the inner reinforcing back-up member.

Figure 1:
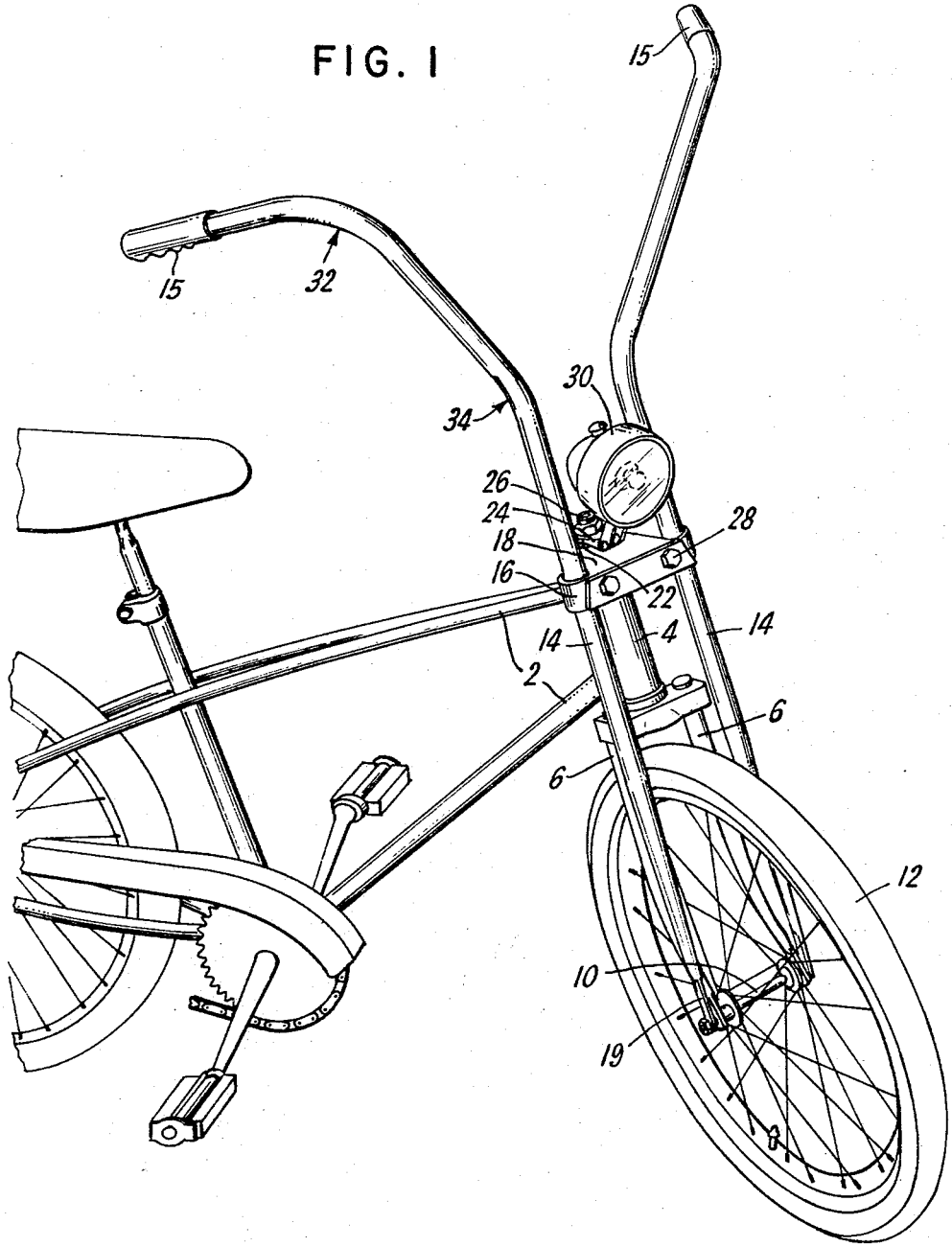
FIGURE 1 is a perspective illustration of a handle bar construction in accordance with this invention.

Referring to FIGURE 1, there is shown a bike having conventional tubular upper and lower reach bars 2 which are united at their forward ends with a head tube or neck 4. A conventional fork 6 has a stem 8 (threaded at its upper end) rotatably mounted in bearings (not shown) within neck 4, and at its lower end accommodates an axle 10 of a pneumatic tired wheel 12. What has been described thus far is entirely conventional in the bicycle art.

Figure 4:
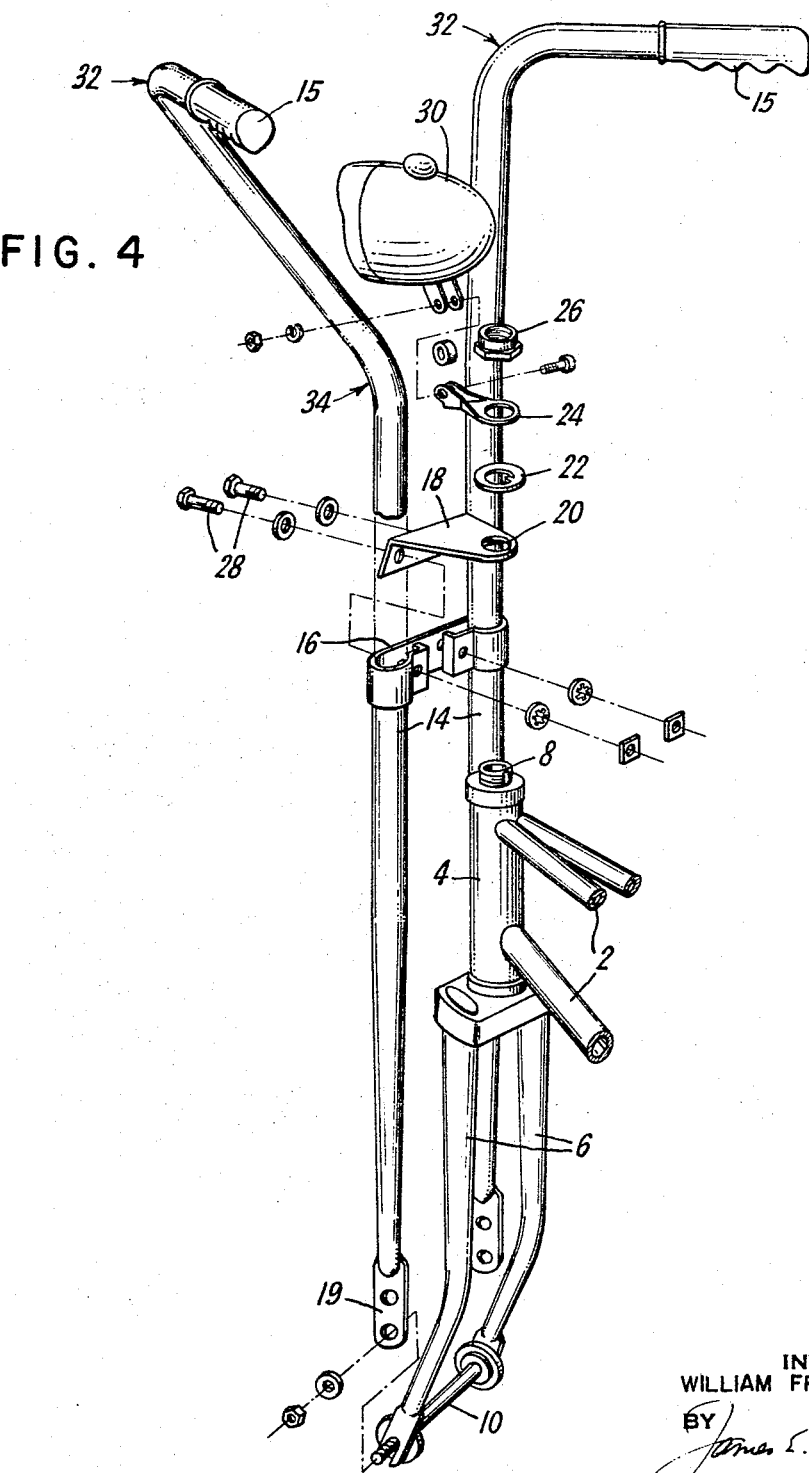
FIGURE 4 is an exploded view of the complete handle bar fork and stem construction according to the invention.

The principal feature of this invention involves a pair of handle bar members 14 which extend all the way downwardly to the front wheel axle 10. Approximately midway along their length the bars 14 are rigidly braced and connected to the fork stem 8 by a bracket structure including a clamp 16 and plate 18. The plate 18 has a circular opening 20 through which the threaded upper stem portion extends. As evident from FIGURE 4, nut and bolt fasteners 28 are secured through matching holes in the clamp 16 and plate 18, serving to tighten the clamp about bars 14 and to connect the clamp 16 to plate 18. On top of the opening 20 there are placed a washer 22, lamp bracket 24 and tightening nut 26. A conventional front headlamp 30 is adjustably mounted on bracket 24 through a nut and bolt fastener as illustrated. At their lower ends the bars 14 are flattened and apertured to join with the fork ends 6 in being tightened at the wheel axle. At their upper portions the bars 14 are bent first outwardly at 34 and then backwardly at a sharp angle at 32, with conventional handle grips 15 covering the open ends of these upper portions.

Referring to FIGURE 3, it should be noted that within the tubular bars there are provided hollow or tubular reinforcing members 29. These members 29 strengthen bars 14 within the clamp 16, thereby improving the clamping action.

It will be evident that in this construction, during steering of the bicycle the bars 14 rotate together with the fork 6, stem 8 and lamp 30 as a single unit. Because of this unitary feature the fork 6 and bars 14 reinforce one another. A second effect is that the handle bars 14 do not have weak points, such as weldments, which are subject to failure under hard usage. Another advantage is that the plate 18 provides an improved structure for mounting the lamp 30, with the lamp being in a protected position between the handle bars and being directed in accordance with steering movements.

It will be understood that various departures from the specifically disclosed embodiment of the invention can be effected without departing from the scope thereof as defined by the following claims:

What is claimed is:
1. In a bicycle having a frame, the combination including:
a head tube,
a front steering fork having a pair of downwardly extending legs adapted to receive a bicycle wheel mounted therebetween, an upper portion joining the two legs and a stem extending upwardly from the upper portion through the head tube,
a pair of individual handle bar members each having an upper portion which diverges rearwardly and outwardly from the other member, an intermediate portion extending downwardly adjacent a corresponding leg of the steering fork and a lower portion adapted to be mounted directly to the axle of the bicycle wheel exterior to the fork mounting, and
a bracket mounted to the intermediate portion of the handle bar members for joining said members in an integral arrangement which possesses a high degree of strength, said bracket including clamping means connecting each handle bar member and connecting said members to the steerable fork and stem structure.

2. The invention according to claim 1 wherein the bracket comprises:
a first member having a pair of openings to receive the intermediate portion of a corresponding handle bar member,
a second plate member having a horizontal rear portion mounted to the uppermost portion of the stem extending through and above the head tube, and
means for clamping the first member about the respective handle bar members and securing the second plate member to the first member to provide a unitary steering arrangement.

3. The invention according to claim 1 wherein:
each of said handle bar members comprises a single continuous length of metal tubing and a reinforcing backup element within the intermediate portion of said member adjacent the bracket.

References Cited
UNITED STATES PATENTS
| | | | |
|---|---|---|---|
| D. 199,480 | 10/1964 | Wyse et al. | D90—8 |
| 714,571 | 11/1902 | Freed | 280—281 |
| 2,091,982 | 9/1937 | Hart. | |
| 2,160,035 | 5/1939 | Schwinn | 280—279 |
| 2,511,320 | 6/1950 | Benson | 280—279 |

FOREIGN PATENTS
689,864   5/1953   Great Britain.

KENNETH H. BETTS, *Primary Examiner.*